(12) United States Patent
Li

(10) Patent No.: US 6,672,740 B1
(45) Date of Patent: *Jan. 6, 2004

(54) CONDENSING AND COLLECTING OPTICAL SYSTEM USING PARABOLIC REFLECTORS OR A CORRESPONDING ELLIPSOID/HYPERBOLOID PAIR OF REFLECTORS

(75) Inventor: Kenneth K. Li, Arcadia, CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 09/604,921

(22) Filed: Jun. 28, 2000

Related U.S. Application Data

(60) Provisional application No. 60/192,879, filed on Mar. 29, 2000, provisional application No. 60/178,700, filed on Jan. 28, 2000, and provisional application No. 60/141,832, filed on Jul. 1, 1999.

(51) Int. Cl.[7] .............................................. F21V 13/08
(52) U.S. Cl. ...................... 362/298; 362/302; 362/201; 362/554; 362/560
(58) Field of Search ................................ 362/554, 560, 362/298, 301, 302, 346, 303, 304, 305

(56) References Cited

U.S. PATENT DOCUMENTS

| | | |
|---|---|---|
| 3,986,767 A | 10/1976 | Rexer et al. |
| 4,473,295 A | 9/1984 | Doyle |
| 4,519,266 A | 5/1985 | Reinecke |
| 4,608,622 A | 8/1986 | Gonser |
| 4,757,431 A | 7/1988 | Cross et al. |
| RE32,912 E | 4/1989 | Doyle |
| 4,957,759 A | 9/1990 | Swartzel et al. |
| 5,191,393 A | 3/1993 | Hignette et al. |
| 5,414,600 A | 5/1995 | Strobl et al. |
| 5,430,634 A | 7/1995 | Baker et al. |
| 5,707,131 A | 1/1998 | Li |
| 5,777,809 A | 7/1998 | Yamamoto et al. |
| 5,900,973 A | 5/1999 | Marcellin-Dibon et al. |
| 5,986,792 A | 11/1999 | Rizkin et al. |
| 6,120,166 A * | 9/2000 | Price .......................... 362/202 |
| 6,227,682 B1 * | 5/2001 | Li .............................. 362/302 |

FOREIGN PATENT DOCUMENTS

EP 0401351 9/1993

* cited by examiner

Primary Examiner—Thomas M. Sember
Assistant Examiner—Anabel Ton
(74) Attorney, Agent, or Firm—Rothwell, Figg, Ernst & Manbeck, PC

(57) ABSTRACT

A condensing and collecting optical system includes a collimating reflector and focusing reflector. The collimating reflector includes a portion of a paraboloid of revolution having a focal point and an optical axis. The focusing reflector includes a paraboloid of revolution having a focal point and an optical axis. A source of the electromagnetic radiation placed at the focal point of the collimating reflector produces a collimated beam of radiation. The focusing reflector is positioned so as to receive the collimated beam and focus it toward a target positioned at the focal point of the focusing reflector. To achieve maximum illumination at the target, the collimating reflector and the focusing reflector are so constructed and positioned so as to achieve preferably about unit magnification between the source and its focused image, although other magnifications may be achieved.

48 Claims, 11 Drawing Sheets

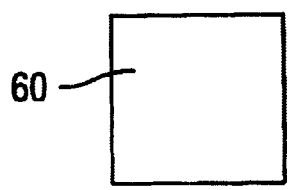
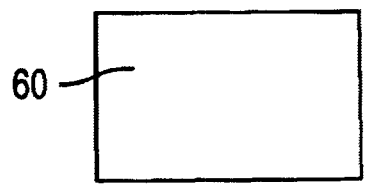
FIG. 8A    FIG. 8B
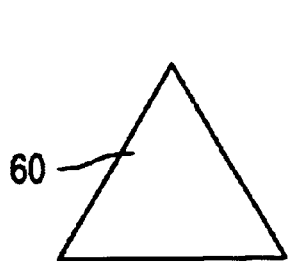
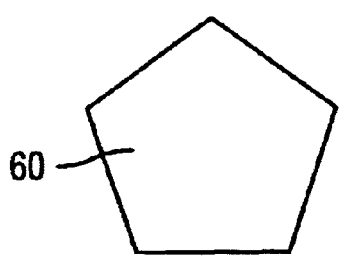
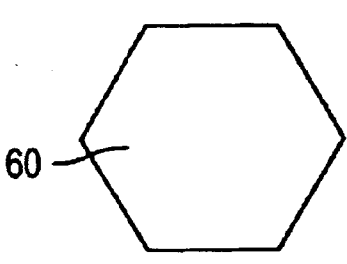
FIG. 8C    FIG. 8D    FIG. 8E
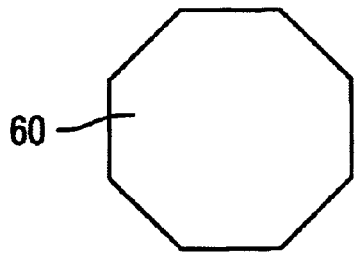
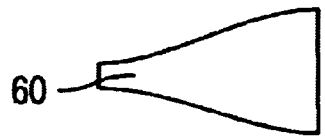
FIG. 10A
FIG. 8F
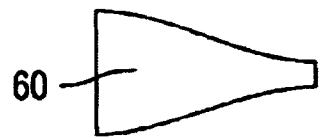
FIG. 10B
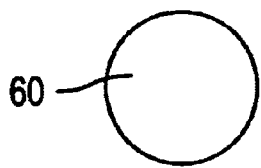
FIG. 9

CONDENSING AND COLLECTING OPTICAL SYSTEM USING PARABOLIC REFLECTORS OR A CORRESPONDING ELLIPSOID/ HYPERBOLOID PAIR OF REFLECTORS

This application claims the benefit of U.S. Provisional Application Nos. 60/192,879 filed Mar. 29, 2000, No. 60/178,700 filed Jan. 28, 2000, and No. 60/141,832 filed Jul. 1, 1999, the contents of which are hereby incorporated by reference.

FIELD OF THE INVENTION

This invention relates to systems for collecting and condensing electromagnetic radiation, particularly a system incorporating parabolic reflectors for collecting radiation emitted from a radiation source and focusing the collected radiation onto a target.

BACKGROUND OF THE INVENTION

The functional objective for systems that collect, condense, and couple electromagnetic radiation into a standard waveguide, such as a single fiber or fiber bundle, or outputs to a homogenizer of a projector, is to maximize the brightness (i.e., maximize the flux intensity) of the electromagnetic radiation at the target. The prior art teaches the use of so-called on-axis reflector systems involving spherical, ellipsoidal, and parabolic reflectors and off-axis reflector systems involving spherical, toroidal, and ellipsoidal reflectors. Where the target has dimensions that are similar to the size of the arc gaps of the electromagnetic radiation source, off-axis reflector systems achieve higher efficiency and brightness at the target than on-axis systems, thereby maximizing the amount of light that can be collected by a fiber optic target. For targets having dimensions that are much larger than the arc gaps of the electromagnetic source, both on-axis and off-axis reflector systems are effective for collecting, condensing, and coupling the radiation from a radiation source into a wave guide.

A disadvantage of on-axis systems is that they inherently redirect the radiation from the radiation source into larger images that are dependent on the direction of the emitted radiation, thus defeating the goal of concentrating the radiation into the smallest possible spot when the radiation source is incoherent. For example, a known on-axis ellipsoidal system produces magnifications that range from 2 to 8, dependent on the emission angle of the electromagnetic radiation. The variously magnified radiation beams are superimposed upon one another, thereby causing distortion and magnification of the collected image.

Furthermore, an ellipsoidal collecting and condensing system does not produce parallel (i.e., collimated) radiation beams. This is a disadvantage because collimated beams can facilitate filtering of the collected radiation when needed.

In known on-axis parabolic systems, the divergence of the reflected beam is also dependent on the angle of emission from the radiation source. Furthermore, such systems require the use of one or more focusing lens, which, under perfect conditions, produce a distorted image, and, in reality, typically produce badly aberrated images which effectively increase the image size and reduce brightness, or flux intensity. Furthermore, the outputs of an on-axis system are always circularly symmetric and, therefore, may not be suitable for non-circular targets.

U.S. Pat. No. 4,757,431 describes an improved condensing and collecting system employing an off-axis spherical concave reflector which enhances the maximum flux intensity illuminating a small target and the amount of collectable flux density by the small target. This system was further improved in U.S. Pat. No. 5,414,600, in which the off-axis concave reflector is an ellipsoid, and U.S. Pat. No. 5,430, 634, in which the off-axis concave reflector is a toroid. Although the toroidal system described in the '634 patent corrects for astigmatism, and the ellipsoidal system of the '600 patent provides a more exact coupling than the spherical reflector of the '431 patent, each of these systems requires the application of an optical coating onto a highly curved reflective surface. Applying optical coatings to such curved surfaces is expensive, and achieving a uniform coating thickness is difficult. Furthermore, in such systems the source image is focused directly from the source to the target in a relatively small space, thereby making the insertion of other optical elements, such as filters and attenuators, difficult due to the lack of space.

In the field of spectroscopy, it is necessary to focus electromagnetic radiation down to a very small spot at a sample under test and to thereafter collect the radiation reflected by the sample. Off-axis parabolic reflectors have been used for this purpose. U.S. Pat. No. 3,986,767 shows a system in which a parallel beam is focused into a small spot directly onto a sample under test using an off-axis paraboloid. U.S. Pat. No. Re 32,912 shows the use of paraboloids whereby light is focused onto a sample under test using one reflective paraboloid, and the light from that same focus is collected using a second reflective paraboloid. U.S. Pat. No. 4,473,295 describes yet another configuration for using reflective paraboloids to focus and collect radiation onto and from a sample under test.

U.S. Pat. No. 5,191,393, and its corresponding European Patent No. 0 401 351 B1, describe a system whereby light is transmitted from a location outside a cleanroom to a location inside the cleanroom for performing optical measurement of small features. One of the configurations described for collecting and transmitting light includes an arc lamp, two parabolic reflectors, a single fiber target, and transmissive dichroic filters for filtering out unnecessary wavelengths. A first parabolic reflector collects light that is reflected from the source off of a filtering reflector and creates a collimated beam. The collimated beam may pass through one or more additional filters before impinging on the second parabolic reflector, which collects and focuses the collimated beam into the single-fiber target. None of these references, however, describes a system for achieving unit magnification between the source and the focused image so as to obtain the maximum flux intensity with the minimum distortion at the target.

Therefore, there remains a need to provide a method of collecting and concentrating electromagnetic radiation using parabolic reflectors that maximizes the flux intensity of the focused radiation beam at the target.

SUMMARY OF THE INVENTION

In accordance with aspects of the present invention, an improved system for collecting and condensing electromagnetic radiation employs parabolic reflectors and achieves unit magnification, or near unit magnification, between a source image and a focused image at a target, thereby producing maximum focused intensity at the target. In particular, the present invention is directed to an optical device for collecting electromagnetic radiation from a source of electromagnetic radiation and focusing the collected radiation onto a target to be illuminated with at least a portion of the electromagnetic radiation emitted by the source. The device includes a collimating reflector and a focusing reflector. The collimating reflector comprises at least a portion of a paraboloid of revolution and has an optical axis and a focal point on the optical axis. A source located proximate the focal point of the collimating reflector produces collimated rays of radiation reflected from the collimating reflector in a direction parallel to the optical axis. The focusing reflector comprises at least a portion of a paraboloid of revolution and has an optical axis and a focal point on the optical axis. The focusing reflector is positioned and oriented with respect to the collimating reflector so that the collimated rays of radiation reflected from the collimating reflector are reflected by the focusing reflector and focused toward a target located proximate the focal point of the focusing reflector. The collimating reflector and the focusing reflector have slightly different shapes or substantially the same size and shape and may be oriented optically about symmetrically with respect to each other so that each ray of radiation reflected by a surface portion of the collimating reflector is reflected by a corresponding surface portion of the focusing reflector toward the target to achieve substantially a unit magnification.

A retro-reflector may be used in conjunction with the collimating reflector to capture radiation emitted by the source in a direction away from the collimating reflector and reflect the captured radiation back through the source (i.e., through the focal point of the collimating reflector) toward the collimating reflector to thereby increase the intensity of the collimated rays reflected therefrom.

The collimated and focusing reflectors can be arranged in an opposed, facing relationship with their respective optical axes collinearly arranged, or they can be arranged with their optical axes arranged at an angle with respect to each other, in which case a redirecting reflector is employed to redirect the collimated rays reflected by the collimating reflector toward the focusing reflector.

Alternately, the collimating reflector and the focusing reflector comprise an ellipsoid/hyperboloid pair with one of the collimating and focusing reflectors having a substantially ellipsoid shape, and the other of the collimating and focusing reflectors having a corresponding substantially hyperboloid shape with each reflector of the ellipsoid/hyperboloid pair having a corresponding size and optical orientation with respect to each other so that each ray of radiation reflected by a surface portion of the collimating reflector is reflected by a corresponding surface portion of the focusing reflector toward the target so as to preferably achieve about unit magnification between the source and an image focused onto the target. Depending on applications, larger or smaller magnifications other than one can be used resulting in reduced brightness, i.e., magnifications of from about 0.5 to about 5.

Filters or other optical elements can be arranged between the collimating and focusing reflectors.

DESCRIPTION OF THE DRAWINGS

Embodiments of the present invention will be described with reference to the attached drawings in which like components or features in the various figures are represented by like reference numbers.

FIGS. 8a–8f are schematic views of a plurality of polygonal waveguide targets in cross-sections which may be employed in embodiments of the present invention.

FIG. 9 is a schematic view of a circular cross-section waveguide target which may be utilized in the present invention.

FIG. 10a is a schematic side view illustrating an increasing taper waveguide target according to one embodiment of the invention.

FIG. 10b is a schematic side view illustrating a decreasing taper waveguide target in accordance with another embodiment.

DETAILED DESCRIPTION OF EXEMPLARY EMBODIMENTS OF THE INVENTION

With reference to the figures, exemplary embodiments of the invention will now be described. These embodiments illustrate principles of the invention and should not be construed as limiting the scope of the invention.

Figure 1:
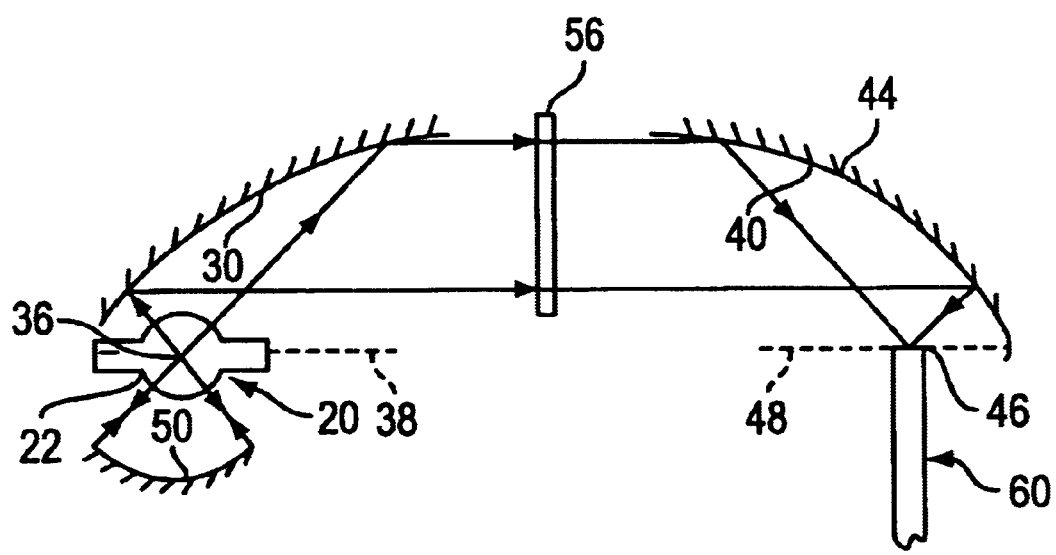
FIG. 1 is a schematic view, shown in cross-section, of an embodiment of a condensing and collecting optical system according to the present invention.

Referring to FIG. 1 as showing a representative embodiment of the present invention, the invention has associated therewith the following four main components:

1. Electromagnetic Source

The electromagnetic source 20 is preferably a light source having an envelope 22. Most preferably, the source 20 comprises an arc lamp such as a xenon lamp, a metal-halide lamp, an HID lamp, or a mercury lamp. For certain applications, filament lamps, e.g. halogen lamps, can be used, provided the system is modified to accommodate the non-opaque filaments of the lamp, as will be described in more detail below.

2. Collimating Reflector

The collimating reflector 30 comprises a portion of a paraboloid of revolution having an optical axis 38 and a focal point 36. In the embodiment shown in FIG. 2, the collimating reflector 30 comprises a first quadrant 32 and a second quadrant 34 of a paraboloid of revolution. Alternatively, the collimating reflector 30 may comprise a single quadrant, more or less, of a paraboloid of revolution. The collimating reflector 30 preferably has a reflective coating (e.g., aluminum or silver) and the surface is highly polished. For certain applications, the collimating reflector 30 can be made from glass coated with a wavelength-selective multi-layer dielectric coating. For example, a cold coating with high reflectivity only in the visible wavelengths can be used for visual light applications. With the source 20 placed at the focal point 36 of the collimating reflector, electromagnetic radiation that contacts the reflector 30 will be reflected as a collimated beam parallel to the optical axis 38 of the reflector 30. Where the source 20 is an arc lamp, the arc gap is preferably small compared to the focal length of the collimating reflector 30.

3. Focusing Reflector

Figure 2:
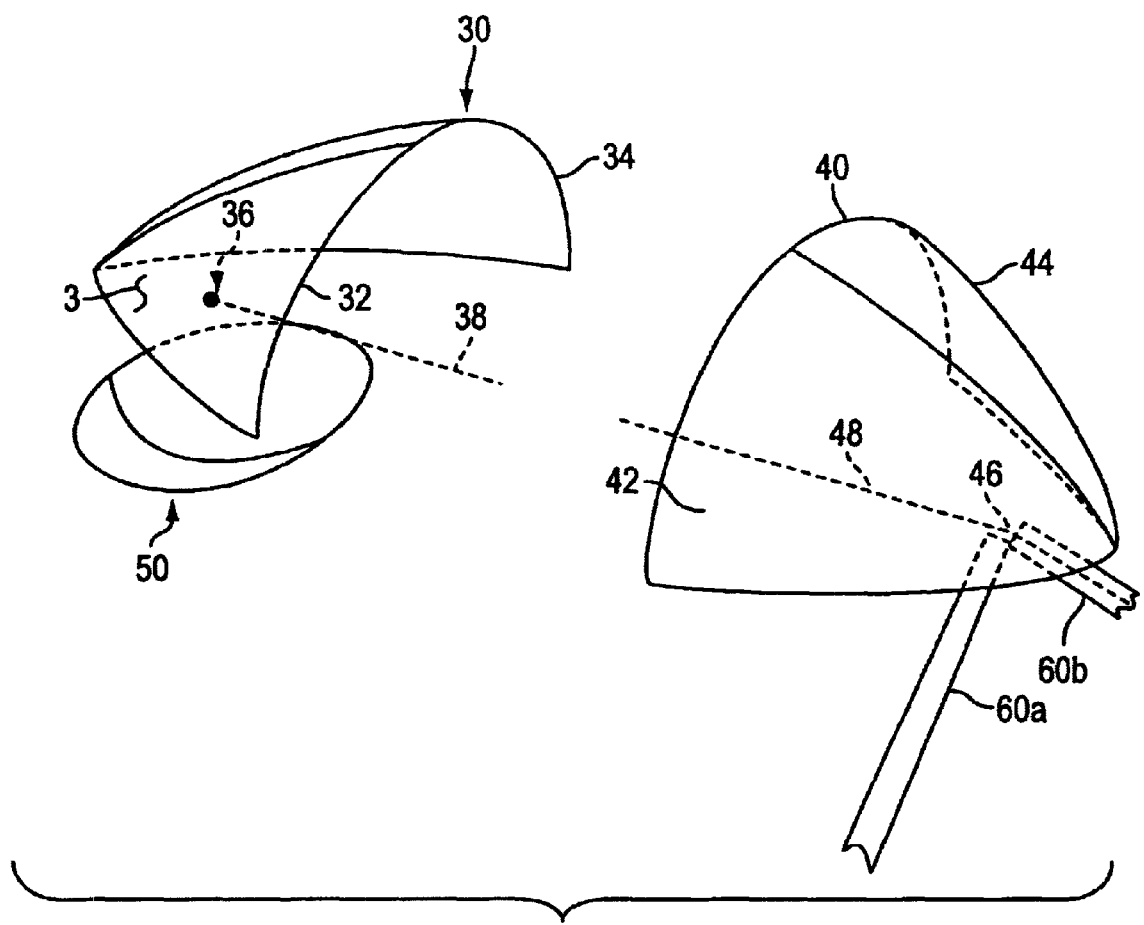
FIG. 2 is a perspective view of a condensing and collecting optical system according to the present invention.

The focusing reflector 40 comprises a portion of a paraboloid of revolution having an optical axis 48 and a focal point 46. As shown in FIG. 2, the focusing reflector 40 comprises a first quadrant 42 and second quadrant 44 of a paraboloid of revolution. Alternatively, the focusing reflector 40 may comprise a single quadrant, more or less, of a paraboloid of revolution. The focusing reflector 40 may be of slightly different shape, or may be of substantially the same size and substantially the same shape as the collimating reflector 30. For example, if the collimating reflector 30 comprises a single quadrant of a paraboloid of revolution, the focusing reflector 40 should be substantially a single quadrant of the same paraboloid of revolution.

The focusing reflector 40 is positioned and oriented so that the collimated electromagnetic radiation reflected by the collimating reflector 30 impinges the parabolic surface of the focusing reflector 40 and is thereafter focused toward the focal point 46 of the focusing reflector 40. In order to achieve unit magnification between the collimating reflector 30 and the focusing reflector 40 (i.e., a focused image that is substantially the same size as the source), it is important that each ray of electromagnetic radiation reflected and collimated by a surface portion of the collimating reflector 30 be reflected and focused by a corresponding surface portion of the focusing reflector 40 in order to achieve a focus at the focal point 46 that is of the maximum possible brightness. In the context of the present disclosure, orienting and positioning the collimating reflector 30 and the focusing reflector 40 with respect to each other so that each ray of electromagnetic radiation collimated by a surface portion of the collimating reflector 30 is focused by a corresponding surface portion of the focusing reflector 40 will be referred to as positioning the reflectors in "optical symmetry" with respect to each other.

4. Target

The target 60 is a small object requiring illumination with the highest intensity possible. In the preferred embodiment, the target 60 is a waveguide, such as a single core optic fiber, a fused bundle of optic fibers, a fiber bundle, or a homogenizer. An input end of the target, e.g. a proximal end of the optic fiber, is positioned at the focal point of the focusing reflector 40 to receive thereat the focused rays of electromagnetic radiation reflected by the focusing reflector 40.

As noted above, the target 60 can be a waveguide, and can be polygonal in cross-section as shown in FIGS. 8a–8f, or circular in cross-section as shown in FIG. 9. Further, target 60 can be an increasing taper waveguide as shown in FIG. 10a, or a decreasing taper waveguide as shown in FIG. 10b.

While the target and the source are intimately associated with the collecting and condensing system of the present invention, according to its broader aspects, the invention relates to the use of two parabolic reflectors of substantially the same size and shape arranged so as to be optically symmetric with respect to each other.

Continuing with the description of the collecting and condensing system, in the arrangement shown in FIG. 1, the collimating reflector 30 and the focusing reflector 40 are positioned in an opposed, facing relation with respect to each other so as to be concave toward each other. Optical symmetry is achieved in the arrangement of FIG. 1 by arranging the collimating reflector 30 and the focusing reflector 40 so that their respective optical axes 38 and 48 are collinear and so that the reflective surface of the collimating reflector 30 is an opposed, facing relation with the corresponding reflecting surface of the focusing reflector 40 achieving a unit magnification.

In an alternative embodiment, with reference to FIG. 1, the collimating reflector 30 and focusing reflector 40 comprise a collimating/focusing reflector pair which is an ellipsoid/hyperboloid pair wherein one of the collimating and focusing reflectors 30 and 40, respectively, have a substantially ellipsoid shape and the other of the collimating and focusing reflectors 30 and 40, respectively, have a corresponding substantially hyperboloid shape, with each reflector of the ellipsoid/hyperboloid pair having a corresponding size and optical orientation with respect to each other so that each ray of radiation reflected by a surface portion of the collimating reflector 30 is reflected by a corresponding surface portion of the focusing reflector 40 toward the target so as to achieve preferably about unit magnification between the source and an image focused onto the target. Depending on applications, larger or smaller magnifications other than one can be used with reduced brightness, i.e., magnifications of from about 0.5 to about 5.

As shown in FIG. 2, where the collimating reflector comprises a first quadrant 32 and a second quadrant 34 of a paraboloid of revolution, and the focusing reflector 40 comprises a first quadrant 42 and a second quadrant 44 of a similarly-sized and shaped paraboloid of revolution, it is possible to accommodate two targets, namely fibers 60a and 60b, so as to achieve two independent outputs. In the illustrated embodiment, the fiber 60a receives electromagnetic radiation from the second quadrant 34 of the collimating reflector 30 and the second quadrant 44 of the focusing reflector 40. The fiber 60b receives electromagnetic radiation from the first quadrant 32 of the collimating reflector 30 and the first quadrant 42 of the focusing reflector 40. To allow simultaneous placement of the two fibers 60a and 60b, the first quadrant 42 and the second quadrant 44 of the focusing reflector 40 must be spatially offset from one another by a small amount along the optical axis of the focusing reflector 40.

As shown in FIGS. 1 and 2, the collecting and condensing system of the present invention may incorporate the use of a retro-reflector 50, which, in the illustrated embodiment, is a spherical retro-reflector. The retro-reflector 50 is positioned to capture electromagnetic radiation emitted by the source 20 that would not otherwise impinge on the collimating reflector 30. More particularly, the spherical retro-reflector 50 is constructed and arranged so that radiation emitted by the source 20 in a direction away from the collimating reflector 30 is reflected by the retro-reflector 50 back through the focal point 36 of the collimating reflector 30 and thereafter toward the collimating reflector 30. This additional radiation reflected by the collimating reflector 30 is collimated and added to the radiation that impinges the collimating reflector 30 directly from the source 20 to thereby increase the intensity of the collimated radiation reflected toward the focusing reflector 40. Consequently, the intensity of the radiation at the focal point 46 of the focusing reflector 40 is also increased.

Figure 11:
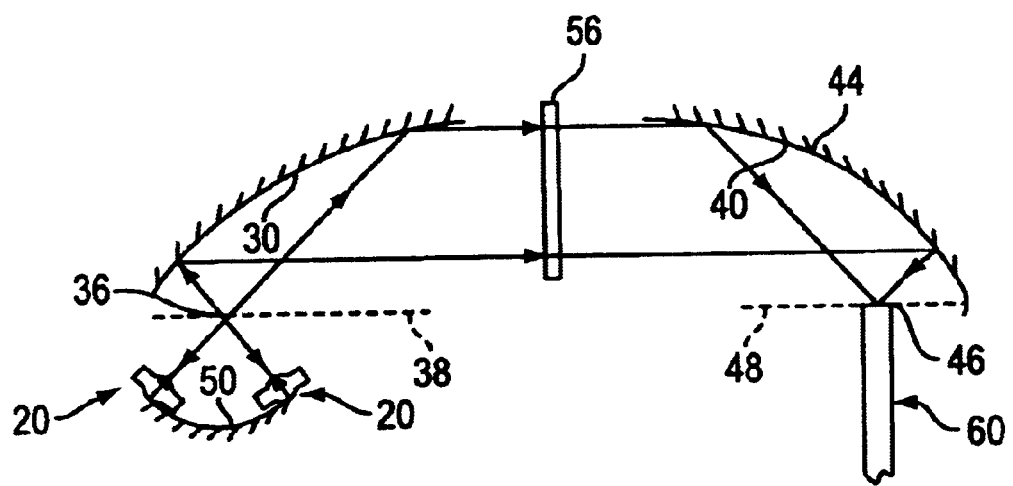
FIG. 11 is a schematic view, shown in cross-section, of an embodiment of a condensing and collecting optical system according to the present invention.
Figure 12:
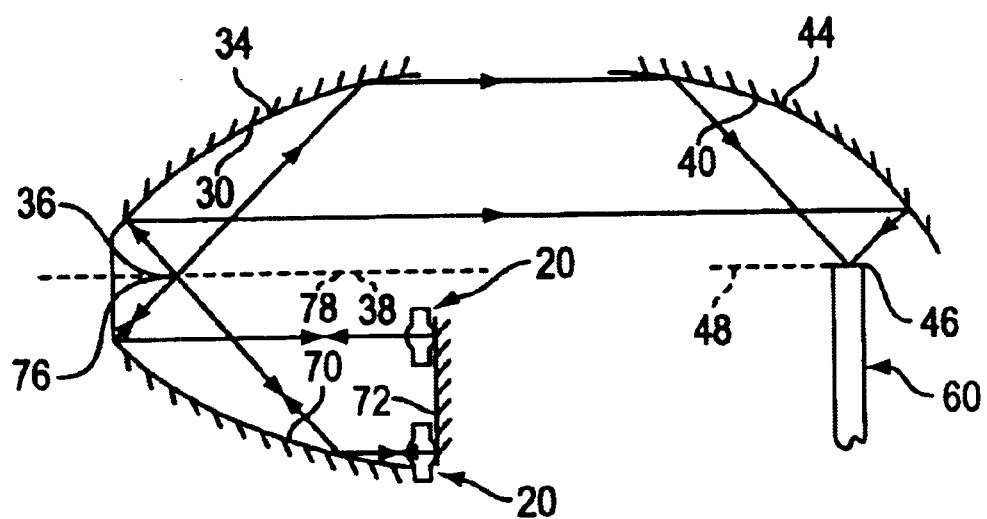
FIG. 12 is a schematic view, shown in cross-section, of an embodiment of a condensing and collecting optical system according to the present invention.
Figure 13:
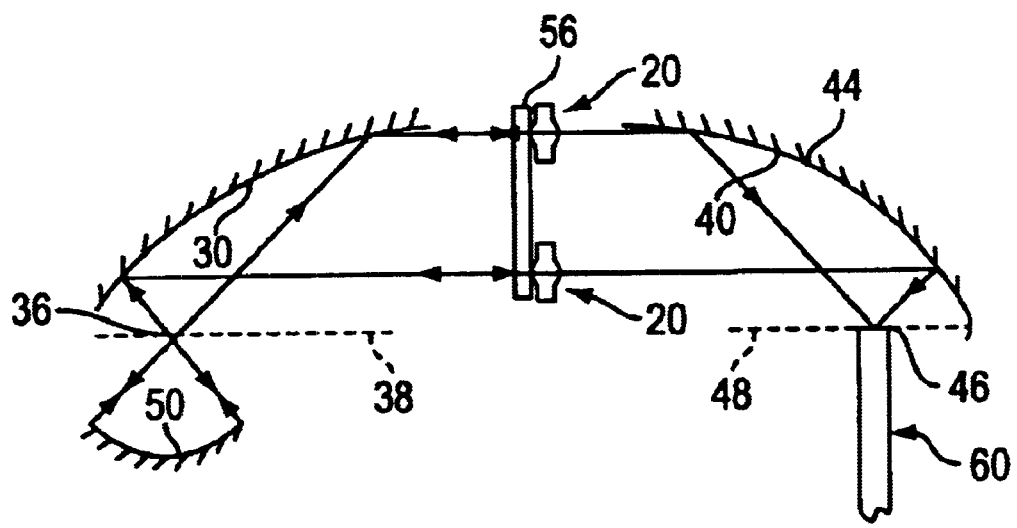
FIG. 13 is a schematic view, shown in cross-section, of an embodiment of a condensing and collecting optical system according to the present invention.

Since the rays of radiation pass through focal point 36, it is apparent that sources 20 may be placed anywhere along a ray of radiation, such as, e.g. on the retro-reflector 50 or flat reflector 72, with substantially the same function and effect, as shown in FIGS. 11, 12, and 13. In this case there may be no reason to polish retro-reflector 50 or flat reflector 72 to reflect radiation.

If a filament lamp is employed as the source 20, the retro-reflector cannot be oriented so that it focuses radiation back through the focal point 36 of the collimating reflector 30, because the retro-reflected radiation would be blocked by the opaque filaments located at the focal point 36. In this case, the position of the retro-reflector 50 should be adjusted so that the retro-reflected radiation does not pass precisely through the focal point 36.

As an alternative to a spherical retro-reflector, the retro-reflecting function can be performed by a two-dimensional corner cube array (not shown) with unit elements sized on the order of the arc size of the source 20 or smaller. Employing a two-dimensional corner cube array eliminates the need for precisely positioning a retro-reflector and will produce a tighter focus at the arc of the source 20.

As shown in FIG. 1, because of the spacial distance separating the collimating reflector 30 and the focusing reflector 40, various optical elements, such as filter 56, may be inserted between the reflectors 30 and 40. Because the electromagnetic radiation transmitted between the reflectors 30 and 40 is collimated, such optical elements can be of simple shape and design. As shown in FIG. 1, filter 56 is a planar filter.

Figure 3:
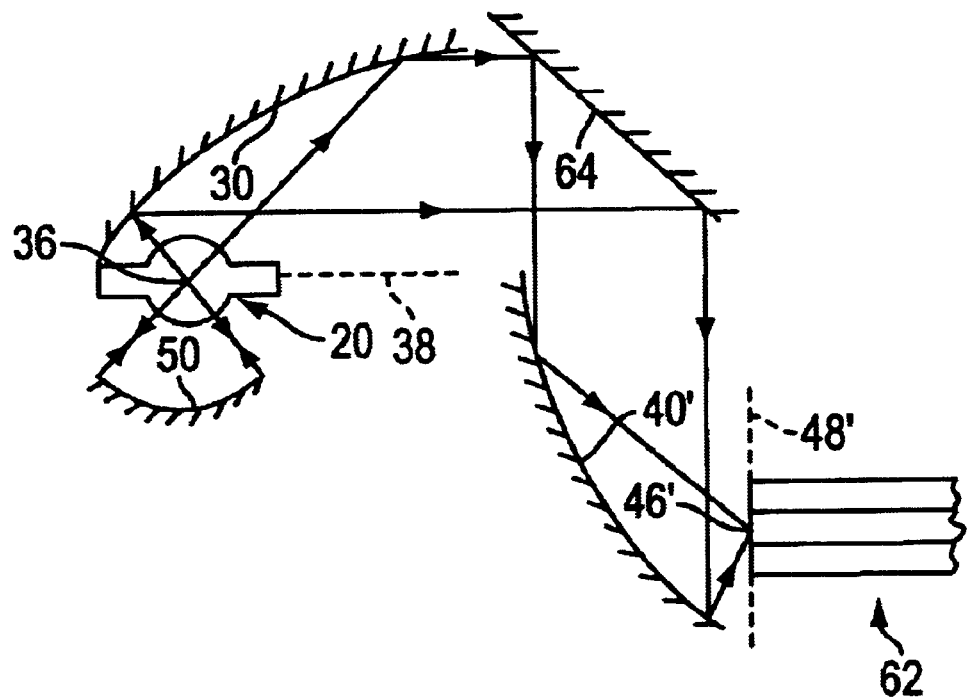
FIG. 3 is schematic view, shown in cross-section, of an alternate embodiment of the condensing and collecting optical system of the present invention.

FIG. 3 shows an alternate arrangement of the collecting and condensing system of the present invention. In the arrangement of FIG. 3, the target 62 is no longer a single optic fiber, but is a bundle of optic fiber 62 (although the arrangement shown could be used with any of the targets described above). Furthermore, in the arrangement of FIG. 3, a focusing reflector 40', having an optical axis 48' and a focal point 46', is offset with respect to the collimating reflector 30. That is, the optical axis 48' of the focusing reflector 40' is not collinear with the optical axis 38 of the collimating reflector 30 as in the embodiment of FIGS. 1 and 2. Optical symmetry between the collimating reflector 30 and the focusing reflector 40' (i.e., unit magnification) is achieved by employing a focusing reflector 40' that is of substantially the same size and shape as the collimating reflector 30 and by precisely positioning a redirecting reflector 64 in the path of the collimated electromagnetic radiation reflected from the collimating reflector 30. The redirecting reflector 64 is a flat reflector so that the reflected radiation is also collimated. The redirecting reflector 64 and the focusing reflector 40' are precisely positioned so that the redirected, collimated radiation is reflected from corresponding surface portions of both the collimating reflector 30 and the focusing reflector 40'.

The arrangement shown in FIG. 3 can be used in situations where spatial or other limitations do not permit the collimating reflector 30 and the focusing reflector 40' to be arranged with their respective optical axes 38, 48' collinear with each other. It should be appreciated that one or more additional redirecting reflectors may be employed to permit further spatial variation of the focusing reflector and the collimating reflector, so long as optical symmetry is maintained.

The redirecting reflector 64 may be a simple reflector, or it may be a reflective filter.

Figure 4:
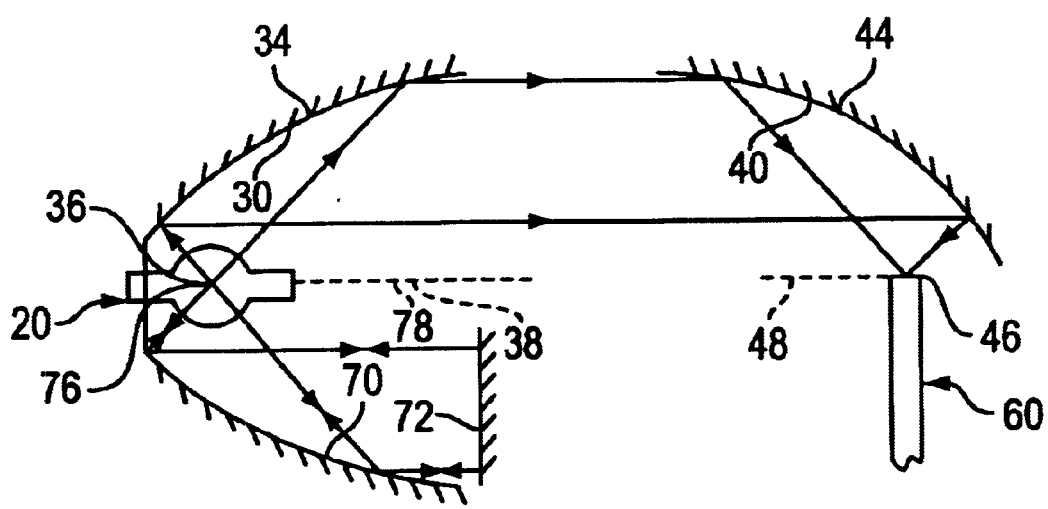
FIG. 4 is a schematic view, shown in cross-section, of another alternate embodiment of the condensing and collecting optical system of the present invention.

Another alternate arrangement of the collecting and condensing system of the present invention is shown in FIG. 4. In the arrangement of FIG. 4, the spherical retro-reflector 50 is replaced by a secondary collimating reflector 70 comprising a paraboloid of revolution having an optical axis 78 and focal point 76 that preferably coincide with the optical axis 38 and the focal point 36, respectively, of the collimating reflector 30. The secondary collimating reflector 70 is preferably of the same size and shape as the collimating reflector 30. That is, if the collimating reflector 30 comprises a single quadrant of a paraboloid of revolution, the secondary collimating reflector 70 would also comprise a single quadrant of a similar paraboloid of revolution.

A flat reflector 72 is positioned substantially perpendicularly to the optical axis 78 at an output end of the secondary collimating reflector 70. As shown in the figure, radiation emitted by the source 20 away from the collimating reflector 30 is reflected and collimated by the secondary collimating reflector 70. The collimated radiation reflected by the reflector 70, which is parallel to the optical axis 78, reflects off the flat reflector 72 back into the secondary collimating reflector 70 and is thereafter reflected back through the focal points 76 and 36 toward the collimating reflector 30, to thereby increase the intensity of the collimated radiation reflected toward the focusing reflector 40. Thus, the secondary collimating reflector 70 and the flat reflector 72 function together as a retro-reflector.

If the collimating and secondary collimating reflectors each comprise two quadrants of a paraboloid of revolution, so that together they define a full paraboloid of revolution, each secondary collimating reflector quadrant will retro-reflect radiation toward the diametrically-opposed collimating reflector quadrant.

Figure 5A:
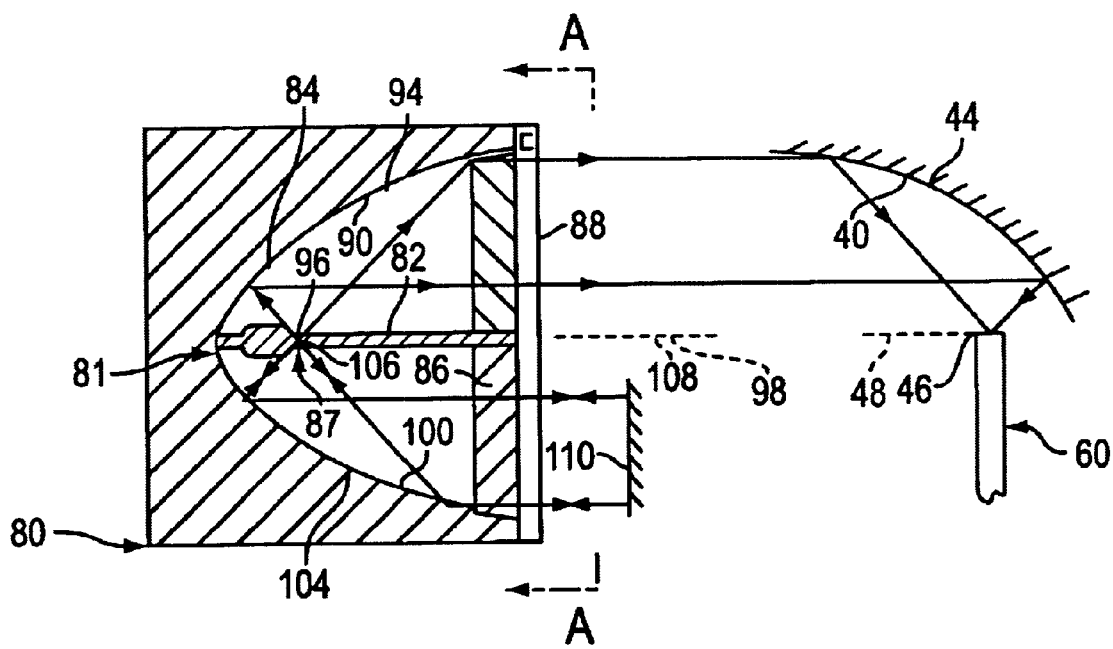
FIG. 5a is a schematic view, shown in cross-section, of still another alternate embodiment of the condensing and collecting optical system of the present invention.
Figure 5B:
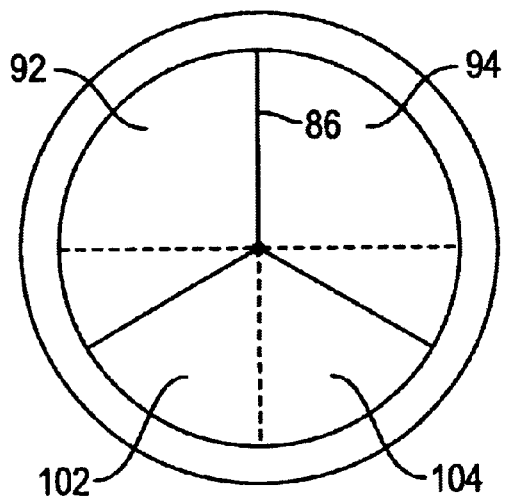
FIG. 5b is an end view of the embodiment of FIG. 5a viewed in the direction indicated by the line A—A.

Another alternative arrangement of the collecting and condensing system of the present invention is shown in FIGS. 5a and 5b. In the arrangement of FIG. 5a, the system includes a cermax lamp 80 having an anode 84, a cathode 82 supported by cathode support members 86, and an arc 87 between the anode and the cathode, which constitutes the source of the collecting and condensing system of FIG. 5a. The cermax lamp 80 includes a parabolic mirror 81 covered at an open end thereof by a window 88. An upper half of the parabolic mirror 81, including first quadrant 92 and second quadrant 94 of the paraboloid of revolution, constitutes the collimating reflector 90 of the system. A lower half of the parabolic reflector 81, including the third quadrant 102 and the fourth quadrant 104 of the paraboloid of revolution, constitutes first and second quadrants, respectively, of a secondary collimating reflector 100. The collimating reflector 90 has a focal point 96 and an optical axis 98, and the secondary collimating reflector 100 has a focal point 106 and an optical axis 108 that coincide with the focal point 96 and the optical axis 98, respectively, of the collimating reflector 90. A flat reflector 110 is disposed in front of an open end of the secondary collimating reflector 100 and is arranged so as to be perpendicular to the optical axis 108 thereof.

Much as with the arrangement of FIG. 4, radiation emitted at the arc 87 directly toward the collimating reflector 90 is reflected toward the focusing reflector 40 in collimated rays that are parallel to the optical axis 98. Radiation emitted by the arc 87 away from the collimating reflector 90 is reflected and collimated by the secondary collimating reflector 100 toward the flat reflector 110. The radiation is thereafter reflected by the flat reflector 110 back into the secondary collimating reflector 100 and through the focal point 96 to the collimating reflector 90. Thus, the secondary collimating reflector 100 and the flat reflector 110 together function as a retro-reflector. The retro-reflected radiation, together with the radiation emitted directly at the collimating reflector 90, is collimated by the first and second quadrants 92 and 94 of the collimating reflector 90 to become a parallel beam exiting the cermax lamp 80 through the window 88. To achieve unit magnification of the focused image at the target, a focusing reflector 40, having an optical axis 48 and a focal point 46, that is the same size and shape of the collimating reflector portion 90 of the cermax lamp is positioned in optical symmetry with respect to the collimating reflector 90. The collimated radiation reflected by the collimating reflector 90 will be focused by the focusing reflector 40 into a focused image having a size similar to the size of the arc 87.

Figure 6:
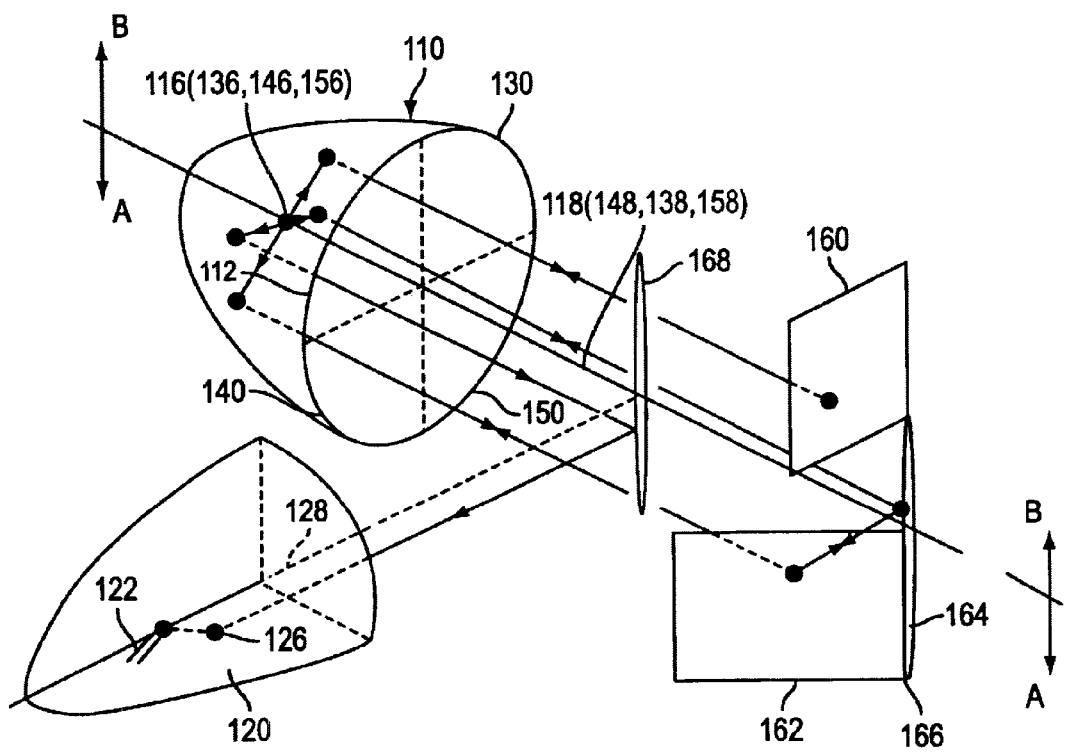
FIG. 6 is a perspective view of still another alternate embodiment of the condensing and collecting optical system of the present invention.
Figure 7A:
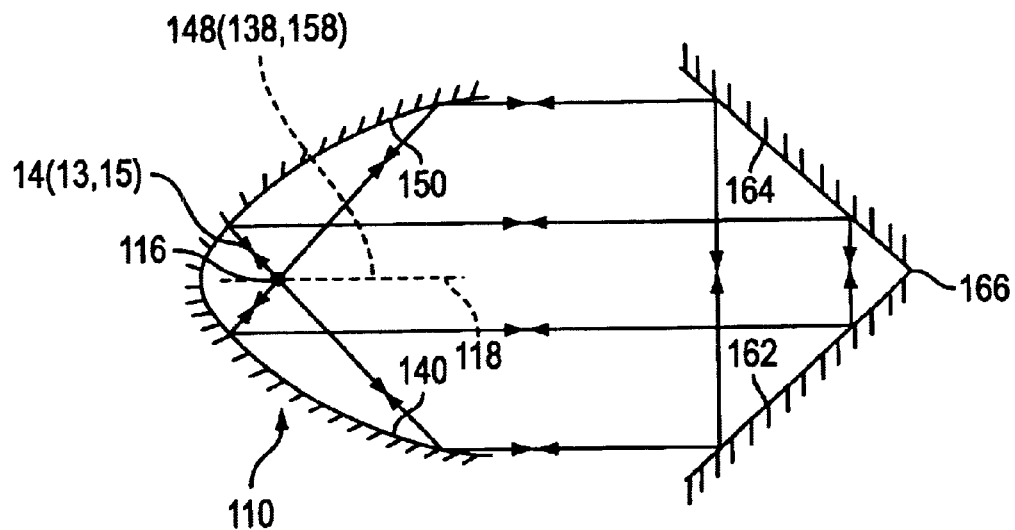
FIG. 7a is a schematic view, shown in cross-section, of the embodiment of FIG. 6 taken in the direction indicated by section line A—A.
Figure 7B:
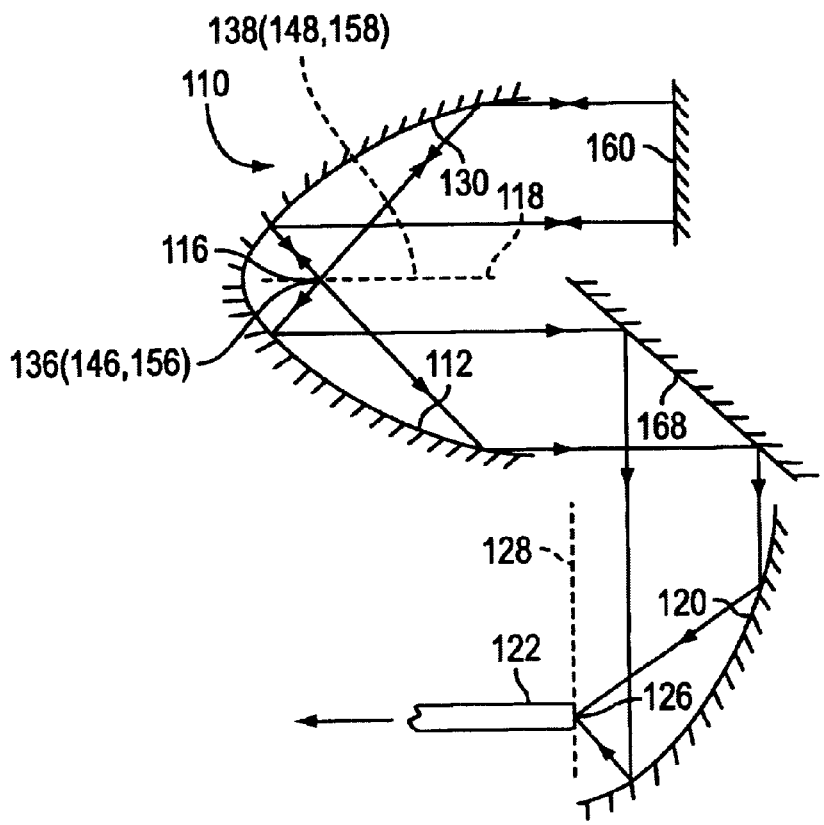
FIG. 7b is a schematic view, shown in cross-section, of the embodiment of FIG. 6 taken in the direction of section line B—B.

FIGS. 6 and 7 show another alternative arrangement of the collecting and condensing system of the present invention in which the reflective output of an entire paraboloid of revolution is collected and condensed into a focusing reflector 120 comprising a single quadrant of a paraboloid of revolution having an optical axis 128 and a focal point 126. In particular, the parabolic reflector 110 defines a collimating reflector 112 having an optical axis 118 and a focal point 116 and comprising a single quadrant of the paraboloid of revolution. The parabolic reflector 110 further defines a first secondary collimating reflector 130 having an optical axis 138 and focal point 136, a second secondary collimating reflector 140 having an optical axis 148 and a focal point 146, and a third secondary collimating reflector having an optical axis 158 and focal point 156. The focal points 116, 136, 146, and 156 preferably coincide with one another as do the optical axes 118, 138, 148, and 158.

A redirecting reflector 168 is operatively positioned with respect to the collimating reflector 112 so as to redirect the collimated reflected output of the reflector 112 toward the focusing reflector 120, which is positioned and arranged so as to be optically symmetric with respect to the collimating reflector 112. Reflector 168 may be a simple reflector or a reflective filter.

A first flat reflector 160 is operatively positioned in front of the first secondary collimating reflector 130 and is arranged so as to be perpendicular to the optical axis 138. Reflector 160 reflects the collimated output of the first secondary collimating reflector 130 back into the reflector 130, thus functioning as a retro-reflector. The retro-reflected radiation is thereafter reflected back through the focal point 136 toward the second secondary collimating reflector 140.

A second flat reflector 162 and a third flat reflector 164 are arranged at right angles to one another and are operatively positioned in front of the second secondary collimating reflector 140 and the third secondary collimating reflector 150, respectively. The apex 166 formed by the right angle intersecting second and third flat reflectors 162 and 164 is arranged at a right angle to the optical axes 118, 138, 148, and 158. The collimated output of the second secondary collimating reflector 140 is reflected from the second flat reflector 162 to the third flat reflector 164 and thereafter back to the third secondary collimating reflector 150. The thus retro-reflected radiation is directed by the third secondary collimating reflector 150 back through its focal point 156 to the collimating reflector 112 and thereafter to the focusing reflector 120 after being redirected by the redirecting reflector 168.

The collimated output of the third secondary collimating reflector 150 is reflected from the third flat reflector 164 to the second flat reflector 162 and is thereafter retro-reflected into the second secondary collimating reflector 140. The thus retro-reflected radiation is directed by the second secondary collimating reflector 140 back through the focal point 146 to the first secondary collimating reflector 130.

Accordingly, it can be appreciated that the light collected by each of the collimating quadrants 112, 130, 140, and 150 is concentrated and focused by the focusing reflector 120 into the target 122.

What is claimed is:

1. An optical device comprising:
   a source of electromagnetic radiation;
   a target to be illuminated with at least a portion of the electromagnetic radiation emitted by said source;
   a collimating reflector having an optical axis and a focal point on said optical axis, said source being located proximate said focal point of said collimating reflector to produce collimated rays of radiation reflected from said collimating reflector in a direction substantially parallel to said optical axis; and
   a focusing reflector comprising at least a portion of a paraboloid of revolution, said focusing reflector having an optical axis and a focal point on said optical axis, said target being located proximate said focal point of said focusing reflector, said focusing reflector being positioned and oriented with respect to said collimating reflector so that the collimated rays of radiation reflected from said collimating reflector are reflected by said focusing reflector and focused substantially toward said target,
   wherein the collimating reflector and the focusing reflector comprise a collimating/focusing reflector pair selected from the group consisting of:
   (a) a pair of reflectors, each reflector of the pair of reflectors comprising at least a portion of a substantial paraboloid of revolution and having about the same size and shape, with the collimating reflector and focusing reflector having a corresponding size and optical orientation with respect to each other so that substantially each ray of radiation reflected by a surface portion of said collimating reflector is reflected by a corresponding surface portion of said focusing reflector toward said target so as to achieve substantially unit magnification between the source and an image focused onto said target, and
   (b) a pair of reflectors comprising an ellipsoid/hyperboloid pair of collimating and focusing reflectors, with one of the collimating and focusing reflectors of the ellipsoid/hyperboloid pair having a substantially ellipsoid shape, and the other of the collimating and focusing reflectors having a correspondingly substantially hyperboloid shape, with each reflector of the ellipsoid/hyperboloid pair having a corresponding size and optical orientation with respect to each other so that substantially each ray of radiation reflected by a surface portion of said collimating reflector is reflected by a corresponding surface portion of said focusing reflector toward said target so as to achieve about unit magnification between the source and an image focused onto said target of from about 0.5 to about 5.

2. The optical device of claim 1, wherein about unit magnification is achieved between said source and said image focused onto said target.

3. The optical device of claim 2, wherein a portion of the electromagnetic radiation emitted by said source of electromagnetic radiation impinges directly on said collimating reflector and a portion of the electromagnetic radiation does not impinge directly on said collimating reflector and wherein said device further comprises one or more additional reflectors constructed and arranged to reflect at least part of the portion of the electromagnetic radiation that does not impinge directly on said collimating reflector toward said collimating reflector through the focal point of said collimating reflector to increase the flux intensity of the collimated rays.

4. The optical device of claim 3, wherein said additional reflectors comprise a spherical retro-reflector disposed on a side of said source opposite said collimating reflector to reflect electromagnetic radiation emitted from said source in a direction away from said collimating reflector toward said collimating reflector through the focal point of said collimating reflector.

5. The optical device of claim 3, wherein said additional reflectors comprise:
   a secondary collimating reflector comprising a portion of a paraboloid of revolution having an optical axis that substantially coincides with the optical axis of said collimating reflector and a focal point that substantially coincides with the focal point of said collimating reflector so that electromagnetic radiation emitted from said source in a direction away from said collimating reflector produces collimated rays of electromagnetic radiation reflected from said secondary collimating reflector in a direction parallel to the optical axis of said secondary collimating reflector; and
   a generally flat reflector that is substantially perpendicular to the optical axis of said secondary collimating reflector and constructed and arranged to reflect the collimated rays of electromagnetic radiation reflected from said secondary collimating reflector to produce collimated rays of electromagnetic radiation reflected from said flat reflector in a direction parallel to the optical axis of said secondary collimating reflector, the collimated rays reflected from said flat reflector thereafter being reflected by said secondary collimating reflector toward said collimating reflector through the focal point of said collimating reflector.

6. The optical device of claim 2, wherein said collimating reflector comprises one or two quadrants of a paraboloid of revolution.

7. The optical device of claim 6, wherein said focusing reflector comprises the same number of quadrants of a paraboloid of revolution as comprises said collimating reflector.

8. The optical device of claim 3, wherein said collimating reflector and said focusing reflector each comprise a single quadrant of a paraboloid of revolution and said additional reflectors comprise:
   first, second, and third secondary collimating reflectors, each comprising a quadrant of a paraboloid of revolution having optical axes that substantially coincide with the optical axis of said collimating reflector and focal points substantially coincident with the focal point of said collimating reflector so that electromagnetic radiation emitted from said source in a direction away from said collimating reflector produces collimated rays of electromagnetic radiation reflected from said first, second, and third secondary collimating reflectors in a direction parallel to the optical axes of said secondary collimating reflectors;
   a first generally flat reflector that is substantially perpendicular to the optical axis of said first secondary collimating reflector and constructed and arranged to reflect the collimated rays of electromagnetic radiation reflected from said first secondary collimating reflector to produce collimated rays of electromagnetic radiation reflected from said first flat reflector in a direction parallel to the optical axis of said first secondary collimating reflector, the collimated rays reflected from said first flat reflector thereafter being reflected by said first secondary collimating reflector toward said second secondary collimating reflector through the focal point of said second secondary collimating reflector; and
   second and third generally flat reflectors oriented perpendicularly with respect to each other and operatively disposed in front of said second and third secondary collimating reflectors, respectively, said second and third flat reflectors being constructed and arranged to:
   (1) reflect the collimated rays of electromagnetic radiation reflected from said second secondary collimating reflector from said second flat reflector toward said third flat reflector to produce collimated rays of electromagnetic radiation reflected from said third flat reflector in a direction parallel to the optical axis of said third secondary collimating reflector, the collimated rays reflected from said third flat reflector thereafter being reflected by said third secondary collimating reflector toward said collimating reflector through the focal point of said collimating reflector, and
   (2) reflect the collimated rays of electromagnetic radiation reflected from said third secondary collimating reflector from said third flat reflector toward said second flat reflector to produce collimated rays of electromagnetic radiation reflected from said second flat reflector in a direction parallel to the optical axis of said second secondary collimating reflector, the collimated rays reflected from said second flat reflector thereafter being reflected by said second secondary collimating reflector toward said first secondary collimating reflector through the focal point of said first secondary collimating reflector.

9. The optical device of claim 2, wherein said optical axes of said collimating and focusing reflectors substantially coincide with one another and wherein said collimating and focusing reflectors are arranged in an opposed, facing relation with respect to each other.

10. The optical device of claim 2, wherein said optical axes of said collimating and focusing reflectors are arranged at an angle with respect to each other and said optical device further comprises a redirecting reflector constructed and arranged to reflect the collimated rays of electromagnetic radiation reflected from said collimating reflector toward said focusing reflector.

11. The optical device of claim 2, further comprising a filter disposed between said collimating reflector and said focusing reflector to filter the collimated rays of radiation reflected by said collimating reflector.

12. The optical device of claim 2, wherein said source comprises a light-emitting arc lamp.

13. The optical device of claim 12, wherein said arc lamp comprises a lamp selected from the group comprising a xenon lamp, a metal halide lamp, an HID lamp, or a mercury lamp.

14. The optical device of claim 2, wherein said source comprises a filament lamp.

15. The optical device of claim 2, wherein said target comprises a waveguide selected from the group comprising a single core optic fiber, a fiber bundle, a fused fiber bundle, or a homogenizer.

16. The optical device of claim 15 wherein said waveguide is selected from the group consisting of circular cross-section waveguides, polygonal cross-section waveguides, tapered waveguides and combinations thereof.

17. An optical device for collecting electromagnetic radiation emitted by a source of electromagnetic radiation and focusing the collected radiation onto a target, said device comprising:

a collimating reflector comprising at least a portion of a paraboloid of revolution, said collimating reflector having an optical axis and a focal point on said optical axis, said collimating reflector producing collimated rays of radiation reflected from said collimating reflector in a direction parallel to said optical axis when a source of electromagnetic radiation is located proximate said focal point of said collimating reflector; and a focusing reflector comprising at least a portion of a paraboloid of revolution, said focusing reflector having an optical axis and a focal point on said optical axis, said focusing reflector being positioned and oriented with respect to said collimating reflector so that the collimated rays of radiation reflected from said collimating reflector are reflected by said focusing reflector and focused toward a target positioned proximate said focal point of said focusing reflector;

wherein said collimating reflector and said focusing reflector have substantially the same size and shape and are oriented optically symmetrically with respect to each other so that each ray of radiation reflected by a surface portion of said collimating reflector is reflected by a corresponding surface portion of said focusing reflector toward said target so as to achieve substantially unit magnification between the source and an image focused onto the target.

18. The optical device of claim 17, further comprising one or more additional reflectors constructed and arranged to reflect at least part of a portion of electromagnetic radiation emitted by the source that does not impinge directly on said collimating reflector toward said collimating reflector through the focal point of said collimating reflector to increase the flux intensity of the collimated rays.

19. The optical device of claim 18, wherein said additional reflectors comprise a spherical retro-reflector disposed on a side of the source opposite said collimating reflector to reflect electromagnetic radiation emitted from the source in a direction away from said collimating reflector toward said collimating reflector through the focal point of said collimating reflector.

20. The optical device of claim 18, wherein said additional reflectors comprise:

a secondary collimating reflector comprising a portion of a paraboloid of revolution having an optical axis that substantially coincides with the optical axis of said collimating reflector and a focal point that substantially coincides with the focal point of said collimating reflector so that electromagnetic radiation emitted from said source in a direction away from said collimating reflector produces collimated rays of electromagnetic radiation reflected from said secondary collimating reflector in a direction parallel to the optical axis of said secondary collimating reflector; and a generally flat reflector that is substantially perpendicular to the optical axis of said secondary collimating reflector and constructed and arranged to reflect the collimated rays of electromagnetic radiation reflected from said secondary collimating reflector to produce collimated rays of electromagnetic radiation reflected from said flat reflector in a direction parallel to the optical axis of said secondary collimating reflector, the collimated rays reflected from said flat reflector thereafter being reflected by said secondary collimating reflector toward said collimating reflector through the focal point of said collimating reflector.

21. The optical device of claim 17, wherein said optical axes of said collimating and focusing reflectors substantially coincide with one another and wherein said collimating and focusing reflectors are arranged in an opposed, facing relation with respect to each other.

22. The optical device of claim 17, wherein said optical axes of said collimating and focusing reflectors are arranged at an angle with respect to each other and said optical device further comprises a redirecting reflector constructed and arranged to reflect the collimated rays of electromagnetic radiation reflected from said collimating reflector toward said focusing reflector.

23. The optical device of claim 17, further comprising a filter disposed between said collimating reflector and said focusing reflector to filter the collimated rays of radiation reflected by said collimating reflector.

24. The optical device of claim 2, wherein said collimating reflector and said focusing reflector have substantially the same size and shape, and are oriented optically substantially symmetrically with respect to each other.

25. An optical device comprising:

a plurality of sources of electromagnetic radiation;

a target to be illuminated with at least a portion of the electromagnetic radiation emitted by said sources;

a collimating reflector having an optical axis and a first focal point on said optical axis, said electromagnetic radiation passing substantially through said first focal point of said collimating reflector to produce collimated rays of radiation reflected from said collimating reflector in a direction substantially parallel to said optical axis; and a focusing reflector having an optical axis and a second focal point on said optical axis, said target being located proximate said second focal point of said focusing reflector, said focusing reflector being positioned and oriented with respect to said collimating reflector so that the collimated rays of radiation reflected from said collimating reflector are reflected by said focusing reflector and focused substantially toward said target; and a spherical retro-reflector having a concave mounting surface that confronts said first collimating reflector and, that has said sources mounted thereon such that the electromagnetic radiation generated by said sources converges substantially at said first focal point.

26. The optical device of claim 25, wherein said collimating and focusing reflectors each comprise at least a portion of a substantial paraboloid of revolution and have about the same size and shape, with the collimating reflector and focusing reflector having a corresponding size and optical orientation with respect to each other so that substantially each ray of radiation reflected by a surface portion of said collimating reflector is reflected by a corresponding surface portion of said focusing reflector toward said target so as to achieve substantially unit magnification between the source and an image focused onto said target.

27. The optical device of claim 25, wherein said collimating and focusing reflectors comprise an ellipsoid/hyperboloid pair of collimating and focusing reflectors, with one of the collimating and focusing reflectors of the ellipsoid/hyperboloid pair having a substantially ellipsoid shape, and the other of the collimating and focusing reflectors having a corresponding substantially hyperboloid shape, with each reflector of the ellipsoid/hyperboloid pair having a corresponding size and optical orientation with respect to each other so that substantially each ray of radiation reflected by a surface portion of said collimating reflector is reflected by a corresponding surface portion of said focusing reflector toward said target so as to achieve about unit magnification between the source and an image focused onto said target of from about 0.5 to about 5.

28. The optical device of claim 25, wherein said optical axes of said collimating and focusing reflectors substantially coincide with one another and wherein said collimating and focusing reflectors are arranged in an opposed, facing relation with respect to each other.

29. The optical device of claim 25, wherein said optical axes of said collimating and focusing reflectors are arranged at an angle with respect to each other and said optical device further comprises a redirecting reflector constructed and arranged to reflect the collimated rays of electromagnetic radiation reflected from said collimating reflector toward said focusing reflector.

30. The optical device of claim 25, further comprising a filter disposed between said collimating reflector and said focusing reflector to filter the collimated rays of radiation reflected by said collimating reflector.

31. The optical device of claim 25, wherein said sources comprise light-emitting arc lamps.

32. The optical device of claim 31, wherein said arc lamps comprise lamps selected from the group comprising xenon lamps, metal halide lamps, HID lamps, or mercury lamps.

33. The optical device of claim 25, wherein said sources comprise filament lamps.

34. The optical device of claim 25, wherein said target comprises a waveguide selected from the group comprising a single core optic fiber, a fiber bundle, a fused fiber bundle, an integrator, or a homogenizer.

35. The optical device of claim 34, wherein said waveguide is selected from the group consisting of circular cross-section waveguides, polygonal cross-section waveguides, tapered waveguides and combinations thereof.

36. An optical device comprising:
a plurality of sources of electromagnetic radiation;
a collimating reflector, said collimating reflector having an optical axis and a first focal point on said optical axis, said electromagnetic radiation passing substantially through said first focal point of said collimating reflector to produce collimated rays of radiation reflected from said collimating reflector in a direction substantially parallel to said optical axis; and
a focusing reflector, said focusing reflector having an optical axis and a second focal point on said optical axis, said focusing reflector being positioned and oriented with respect to said collimating reflector so that the collimated rays of radiation reflected from said collimating reflector are reflected by said focusing reflector and focused toward a target positioned proximate said second focal point of said focusing reflector;
a secondary collimating reflector having an optical axis that substantially coincides with the optical axis of said collimating reflector and a focal point that substantially coincides with the first focal point of said collimating reflector so that rays of electromagnetic radiation reflected toward said secondary collimating reflector in a direction parallel to the optical axis of said secondary collimating reflector are reflected by said secondary collimating reflector and focused toward said focal point of said secondary collimating reflector; and
a generally flat reflector with a mounting surface that confronts said secondary collimating reflector and that has said sources mounted thereon such that the electromagnetic radiation generated by said sources is radiated in parallel toward said secondary collimating reflector.

37. An optical device comprising:
a plurality of sources of electromagnetic radiation;
a target to be illuminated with at least a portion of the electromagnetic radiation emitted by said sources;
a focusing reflector having an optical axis and a focal point on said optical axis, said target being located proximate said focal point of said focusing reflector, said focusing reflector being positioned and oriented so that parallel rays of radiation are reflected by said focusing reflector and focused substantially toward said target; and
a generally flat reflector with a mounting surface that confronts said focusing reflector and that has said sources mounted thereon such that the electromagnetic radiation generated by said sources is radiated in parallel toward said focusing reflector.

38. The optical device of claim 37, wherein said focusing reflector comprises at least a portion of a substantial paraboloid of revolution.

39. The optical device of claim 37, wherein said sources comprise light-emitting arc lamps.

40. The optical device of claim 39, wherein said arc lamps comprise lamps selected from the group comprising xenon lamps, metal halide lamps, HID lamps, or mercury lamps.

41. The optical device of claim 37, wherein said sources comprise filament lamps.

42. The optical device of claim 37, wherein said target comprises a waveguide selected from the group comprising a single core optic fiber, a fiber bundle, a fused fiber bundle, an integrator, or a homogenizer.

43. The optical device of claim 42, wherein said waveguide is selected from the group consisting of circular cross-section waveguides, polygonal cross-section waveguides, tapered waveguides and combinations thereof.

44. The optical device of claim 36, wherein said sources comprise light-emitting arc lamps.

45. The optical device of claim 44, wherein said arc lamps comprise lamps selected from the group comprising xenon lamps, metal halide lamps, HID lamps, or mercury lamps.

46. The optical device of claim 36, wherein said sources comprise filament lamps.

47. The optical device of claim 36, wherein said target comprises a waveguide selected from the group comprising a single core optic fiber, a fiber bundle, a fused fiber bundle, an integrator, or a homogenizer.

48. The optical device of claim 47, wherein said waveguide is selected from the group consisting of circular cross-section waveguides, polygonal cross-section waveguides, tapered waveguides and combinations thereof.

* * * * *